(12) United States Patent
Dutta et al.

(10) Patent No.: US 6,748,150 B1
(45) Date of Patent: Jun. 8, 2004

(54) APPARATUS AND METHOD FOR MANAGING DISPERSION WITHIN AN OPTICAL ADD/DROP MODULE

(75) Inventors: Ranjan Dutta, East Windsor, NJ (US); Diego Fernando Grosz, Middletown, NJ (US); Alejandra B. Gurevich, Maplewood, NJ (US); Alain P. Kung, Fribourg (CH); Magaly Spector, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/426,187

(22) Filed: Apr. 30, 2003

(51) Int. Cl.[7] .............................. G02B 6/42; H04J 14/02
(52) U.S. Cl. ......................... 385/123; 385/24; 385/31; 398/81; 398/82; 398/83; 398/85
(58) Field of Search .......................... 385/24, 122, 123, 385/31, 27; 398/81, 82, 83, 85

(56) References Cited

U.S. PATENT DOCUMENTS

| | | | | |
|---|---|---|---|---|
| 5,224,183 A | * | 6/1993 | Dugan | .......................... 385/24 |
| 5,999,290 A | | 12/1999 | Li | ............................... 359/127 |
| 6,243,176 B1 | * | 6/2001 | Ishikawa et al. | .......... 398/81 X |
| 6,396,609 B1 | * | 5/2002 | Chong et al. | ............. 398/81 X |
| 6,563,978 B2 | * | 5/2003 | Matsuoka et al. | ........ 398/81 X |
| 6,577,422 B1 | * | 6/2003 | Frigo et al. | ............... 398/81 X |
| 6,577,439 B2 | * | 6/2003 | Nakano | .................... 398/81 X |
| 6,594,428 B1 | * | 7/2003 | Tanaka et al. | .............. 385/123 |
| 2001/0022676 A1 | * | 9/2001 | Ishikawa et al. | .......... 398/81 X |
| 2001/0024544 A1 | * | 9/2001 | Matsuoka et al. | ............. 385/24 |
| 2002/0159119 A1 | * | 10/2002 | Fries et al. | ............... 398/81 X |
| 2004/0001715 A1 | * | 1/2004 | Katagiri et al. | ........... 398/81 X |

OTHER PUBLICATIONS

Grosz et al., Demonstration of All–Raman Ultra–Wide–Band Transmission of 1.28 Tb/s (128x10Gb/s) Over 4000 km of NZ–DSF with Large BER Margins, European Conference on Optical Communication, ECOD '01, Paper P.D.B.1.3, pp. 72–73, Amsterdam, NL (2001).

* cited by examiner

Primary Examiner—Brian M. Healy

(57) ABSTRACT

The invention comprises a method and apparatus for implementing a relatively low cost add/drop multiplexer (OADM) wherein pre-demux and post-mux dispersion compensation is employed in a manner that substantially avoids imparting additional dispersion compensation to pass-through wavelength channels in a WDM system.

18 Claims, 3 Drawing Sheets

APPARATUS AND METHOD FOR MANAGING DISPERSION WITHIN AN OPTICAL ADD/DROP MODULE

FIELD OF THE INVENTION

This invention relates generally to the field of fiber-optic transmission systems and, more specifically, to managing dispersion within an optical add/drop multiplexer (OADM).

BACKGROUND OF THE INVENTION

Within an optical communications system such as a wavelength division multiplexed (WDM) or dense WDM (DWDM) system, optical add/drop multiplexers (OADMs) are used to insert (add), remove (drop) or pass through individual optical channels or groups of channels at one or more intermediate locations along an optical fiber path. In long distance WDM systems, transmitted optical signals are subjected to non-linear effects such as self-phase modulation or cross-phase modulation, which effects degrade the transmission performance and quality of the optical signals. Other effects such as pulse broadening due to chromatic dispersion also degrade the transmitted optical signal.

To combat the non-linear and chromatic dispersion effects upon an optical signal due to various characteristics of an optical transmission medium, it is known to impart a complimentary pre-distortion to the optical signal prior to transmission. Post-transmission optical processing may be employed to further mitigate the impact of non-linear and dispersion effects. At an OADM, those optical channels to be passed through bypass pre- and post-transmission dispersion compensation using, for example, an optical blocking filter that passes only the through-channels directly from the optical demultiplexer output to the optical multiplexer input of the OADM.

While the above-described OADM performs its intended function, the cost for implementing such an OADM is relatively high.

SUMMARY OF THE INVENTION

The invention comprises an apparatus and method for implementing an optical add/drop multiplexer (OADM) function in a relatively cost effective manner. Specifically, an OADM according to an embodiment of the present invention imparts a first dispersion compensation to each of the optical channels within a WDM or DWDM signal, extracts those optical channels to be dropped, combines pass-through optical channels and those optical channels to be added and performs a second dispersion compensation on the resulting combined WDM or DWDM signal. The second and first dispersion compensation functions are constrained as follows:

The second compensation function is selected to be appropriate for channels to be added (i.e., equal to the "pre-compensation" normally used within the specific system), and the first dispersion compensation is selected such that the sum of the first and second dispersion compensations is substantially zero. In various embodiments, the second dispersion compensation is negative, while the first dispersion compensation is positive. Advantageously, a positive dispersion may be realized using inexpensive standard single mode fibers (SSMFs).

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

An optical add/drop multiplexer (OADM) according to the present invention will be described primarily within the context of a wavelength division multiplex (WDM) system such as the Lambda Extreme system produced by Lucent Technologies Inc. of Murray Hill, N.J. However, it will be appreciated by those skilled in the art that the subject invention may be advantageously employed in any optical system in which an add/drop function is implemented.

Figure 1:
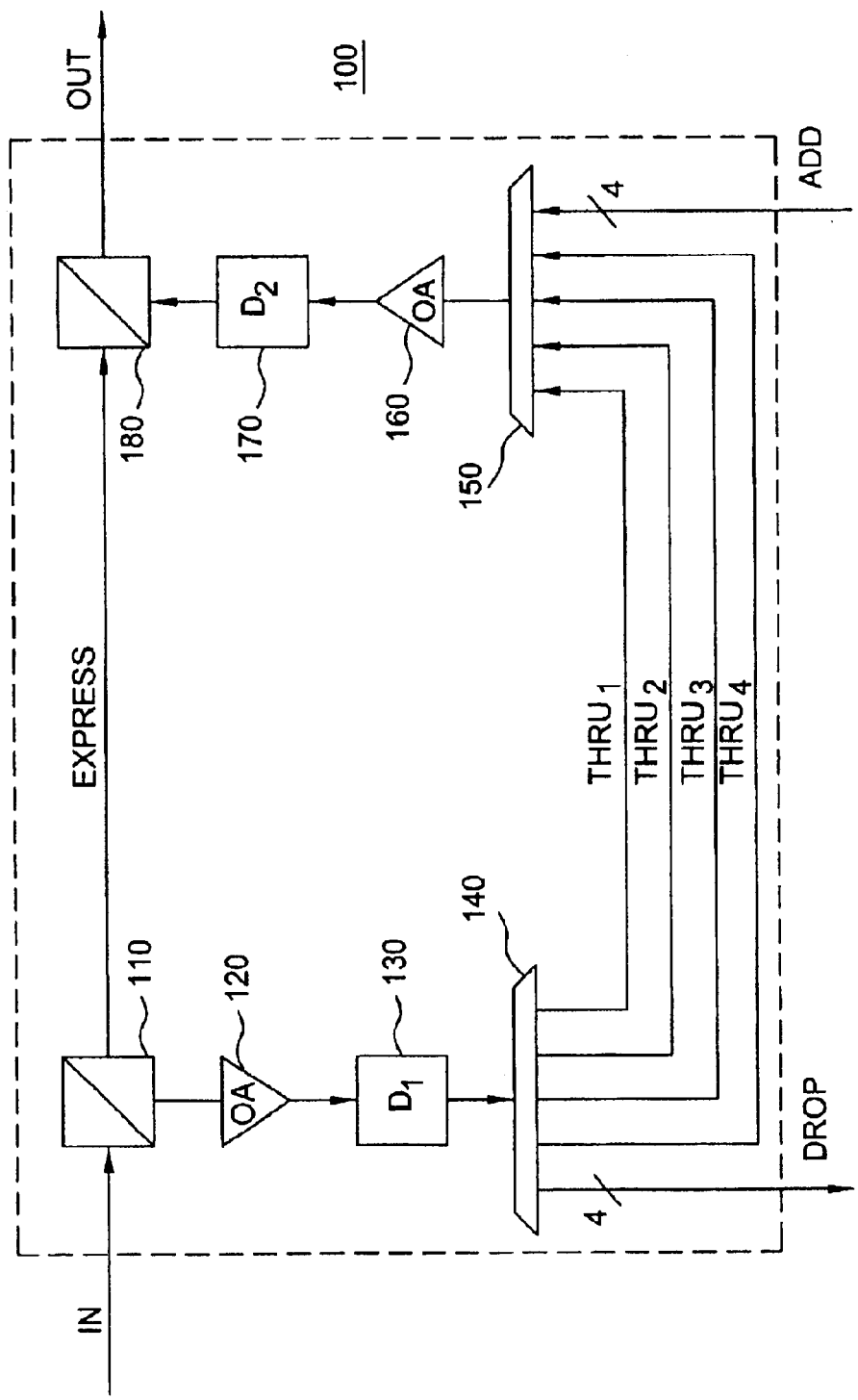
FIG. 1 depicts a high level block diagram of an optical add/drop multiplexer according to an embodiment of the present invention.

FIG. 1 depicts a high level block diagram of an embodiment of an optical add/drop multiplexer according to the present invention.

Specifically, the OADM 100 of FIG. 1 receives a WDM or DWDM input signal IN and responsively produces a corresponding WDM or DWDM output signal OUT. The OADM 100 of FIG. 1 operates to perform a wavelength insertion (ADD), removal (DROP) or passthrough function with respect to individual optical channels or groups of channels provided by the input signal IN. The OADM 100 of FIG. 1 receives a WDM or DWDM input signal IN and responsively produces a corresponding WDM or DWDM output signal OUT. Though four are depicted, more or fewer optical channels or wavelength channels within the input signal IN may be dropped or terminated by the OADM 100. Similarly, though four are shown, more or fewer optical or wavelength channels may be added to the output signal OUT by the OADM 100. Moreover, the structure depicted in FIG. 1 may be replicated to form a plurality of wavelength group processing modules forming an OADM.

The OADM 100 of FIG. 1 comprises a first bandpass filter 110, an optional first optical amplifier (OA) 120, a first dispersion module 130, an optical demultiplexer 140, an optical multiplexer 150, a second OA 160, a second dispersion module 170 and a second bandpass filter 180.

The first bandpass filter 110 operates to extract a group of wavelength channels from the input signal IN, where a group comprises at least one wavelength channel. Illustratively, the first bandpass filter 110 extracts a group of eight wavelength multiplexed channels from the input signal IN. Those wavelength channels within the input signal IN that are not extracted by the first bandpass filter 110 are coupled to the second bandpass filter 180 as remaining or express (i.e., direct from input to output) channels EXPRESS. The optional first optical amplifier 120 is used to amplify the extracted group of wavelength multiplexed channels, which amplified wavelength channels are then provided to the first dispersion compensation module 130. The first dispersion compensation module 130 imparts a dispersion compensation function D1 to the amplified (if OA 120 is used) or unamplified wavelength multiplexed channels extracted by the first bandpass filter 110. The dispersion compensated wavelength multiplexed channels are then provided to the optical demultiplexer 140.

The optical demultiplexer 140 demultiplexes the group of wavelength multiplexed channels received from the first dispersion compensational module 130 to provide a plurality of individual wavelength channels. Those wavelength channels to be dropped are coupled to additional processing elements (not shown) for further processing. Those wavelength channels to be passed through are coupled to respective inputs of optical multiplexer 150. Additionally, the optical multiplexer 150 receives any wavelength channels to be added.

In the embodiment 100 of FIG. 1, it is noted that the first bandpass filter 110 extracts a group of eight wavelength channels form the input signal IN, that the optical demultiplexer 140 drops four channels (DROP) and passes four channels (THRU1–THRU4) to the optical multiplexer 150. The optical multiplexer 150 operates to multiplex the four pass-through wavelength channels (THRU1–THRU4) and the four added channels (ADD) to produce a multiplexed group of eight wavelength channels which is amplified by the second optical amplifier 160 and provided to the second dispersion module 170. More or fewer extracted, express, added, dropped and/or passed through channels may be processed according to the invention.

The second dispersion module 170 imparts a dispersion function D2 to the multiplexed group of eight wavelength channels received from the second OA 160. The output signal produced by the second dispersion compensation module 170 is provided to the second bandpass filter 180. The second bandpass filter 180 operates to insert or otherwise combine the second dispersion compensated and multiplexed group of eight wavelength channels with the remaining or express channels EXPRESS received from the first bandpass filter 110 to produce the WDM or DWDM output signal OUT.

Thus, a "band" of channels is selected by the first bandpass filter 110 for processing by the remaining portions of the OADM 100. In this manner, wavelength channels within the wavelength region associated with the first and second bandpass filters 110, 180 may be dropped from (or added to) the WDM optical signal transported by the optical communications system.

In the OADM 100 of FIG. 1, the input optical signal IN has associated with it a residual dispersion $D_{RES}$. The residual dispersion $D_{RES}$ comprises the pre-dispersion imparted to each wavelength channel within the input signal IN at its point of transmission (if any) added to (or subtracted from) the actual dispersion imparted to the input signal IN by the optical fiber and any prior network elements through which the optical signal or portions of the optical signal have passed through. The dispersion may be calculated using the initial or pre-distortion ($D_{PRE}$) imparted to an optical signal at a transmitter added to number of optical spans (N) multiplied by the residual dispersion per span ($D_{SPAN}$), that is, the dispersion imparted by each span of optical fiber between network elements multiplied by the number of spans traversed. Thus, residual dispersion $D_{RES}$ may be calculated as follows:

$$D_{RES}=D_{PRE}+N*D_{SPAN} \qquad \text{Eq. 1}$$

Thus, for "drop" in channels, the residual dispersion $D_{RES}$ of the extracted (and express) groups of wavelength channels of the input signal IN reaching the OADM is equal to $N*D_{SPAN}$. Specifically, $N*D_{SPAN}$ is the net dispersion that the channels 'carry' when dropped from the OADM, since, as explained below, $D1=D_{PRE}=D2$.

According to the invention, the second dispersion compensation function D2 is selected to be the appropriate dispersion compensation function for those channels that are to be added (ADD). This means that dispersion function D2 is similar to the "pre-compensation" that is used at the input end of the optical transmission system within which the OADM operates. Next, the first dispersion compensation DI is selected such that $D1=-D2$. In this manner, the effect of the second dispersion compensation D2 imparted to through channels (i.e., THRU1–THRU4) substantially negated. Thus, the through channels behave more like the express channels since they effectively experience little or no dispersion compensation within to OADM 100 (i.e., the dispersion compensation imparted to the through channels and express channels after being combined into the output signal OUT remains at effectively the initial input signal residual dispersion $D_{RES}$). In one embodiment, the second dispersion compensation D2 is set equal to approximately −300 ps/nm. The negative dispersion required by the second dispersion compensation D2 may be implemented using a dispersion compensation module (DCM).

For example, in a Gb/s ultra-long-haul system, the amount of pre-compensation will in general depend on the total reach and the fiber type the system is expected to run on. If the transport fiber is standard single-mode fiber (i.e. fiber with relatively high chromatic dispersion), then the pre-compensation is illustratively chosen to be around −800 ps/nm. If the fiber is Truewave™ fiber manufactured by Lucent Technologies (Murray Hill, N.J.) or LEAF™ manufactured by Corning (Corning, N.Y.), then the pre-compensation is illustratively chosen to be −300 ps/nm. In general, pre-compensation is adapted to the characteristics of the particular system. However, the set of proposed rules for managing the dispersion within the OADM are applied in substantially the same manner.

Advantageously, since second dispersion compensation D2 is selected to be a negative value, the corresponding first dispersion compensation D1 is therefore positive. This means that the first dispersion compensation D1 may be implemented using inexpensive standard single mode fibers (SSMFs). For example, a useful reference with a study of the system performance as a function of post-compensation is found in the following paper, which is incorporated herein by reference in its entirety: "Demonstration of All-Raman Ultra-Wide-Band Transmission of 1.28 Tb/s (128×10 Gb/s) over 4000 km of NZ-DSF with Large BER Margins," D. F. Grosz et al., European Conference on Optical Communication, ECOC'01, paper P.D.B.1.3, pages 72–73, Amsterdam, NL (2001).

Figure 2:
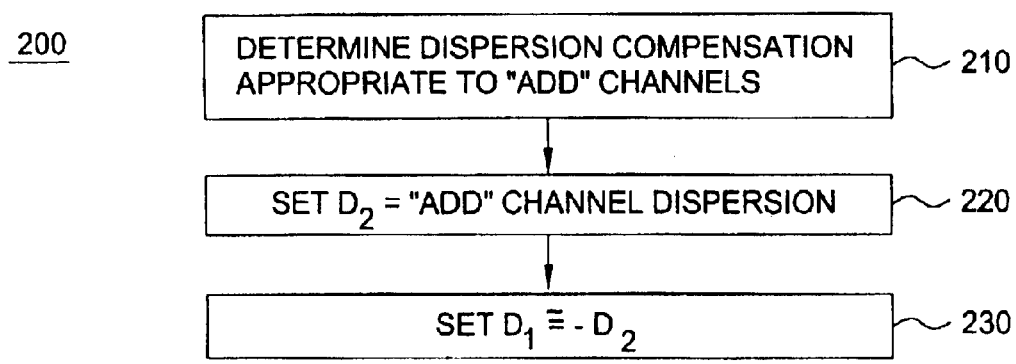
FIG. 2 depicts a flow diagram of a method according to an embodiment of the present invention.

FIG. 2 depicts a flow diagram of a method according to an embodiment of the present invention. Specifically, the method 200 of FIG. 2 is entered at step 210, where the dispersion compensation appropriate to a "ADD" channel(s) is determined. At step 220, the second dispersion compensation D2 is set equal to the "ADD" dispersion calculated at step 210. At step 230, the first dispersion compensation D1 is set equal to approximately the negative of the second dispersion compensation D2.

The above-described invention is primarily described within the context of systems that operate at 10 Gb/s per channel with ultra-long-haul optical reaches of more than a 1,000 km. The inventors contemplate that such a system drops channels with an amount of dispersion of $D_{RES}=N*D_{SPAN}$ within an approximate range of 10 ps/nm to 40 ps/nm. It is noted that 10 Gb/s channels can tolerate approximately up to $D_{RES}=600$ ps/nm without too much degradation to pulse quality. It should be noted that the disclosed set of dispersion management rules for OADMs are adaptable to a broad range of number of spans (e.g., from 15 to 60 spans, which provides reaches of typically 1,500 to 6,000 km assuming that typical fiber spans are 100-km long). Moreover, the disclosed set of dispersion management rules can be used for systems with higher bit rates per channel, such as 40 Gb/s. For these systems, individual dispersion compensation is needed, but it only needs to compensate for N*$D_{SPAN}$, since D1 will tend to cancel out $D_{PRE}$/D2, thereby removing constrains from the design of "per channel tunable dispersion compensators." Finally, the choice of D1/D2 does not depend on where along the communications system path a particular OADM is placed.

Figure 3:
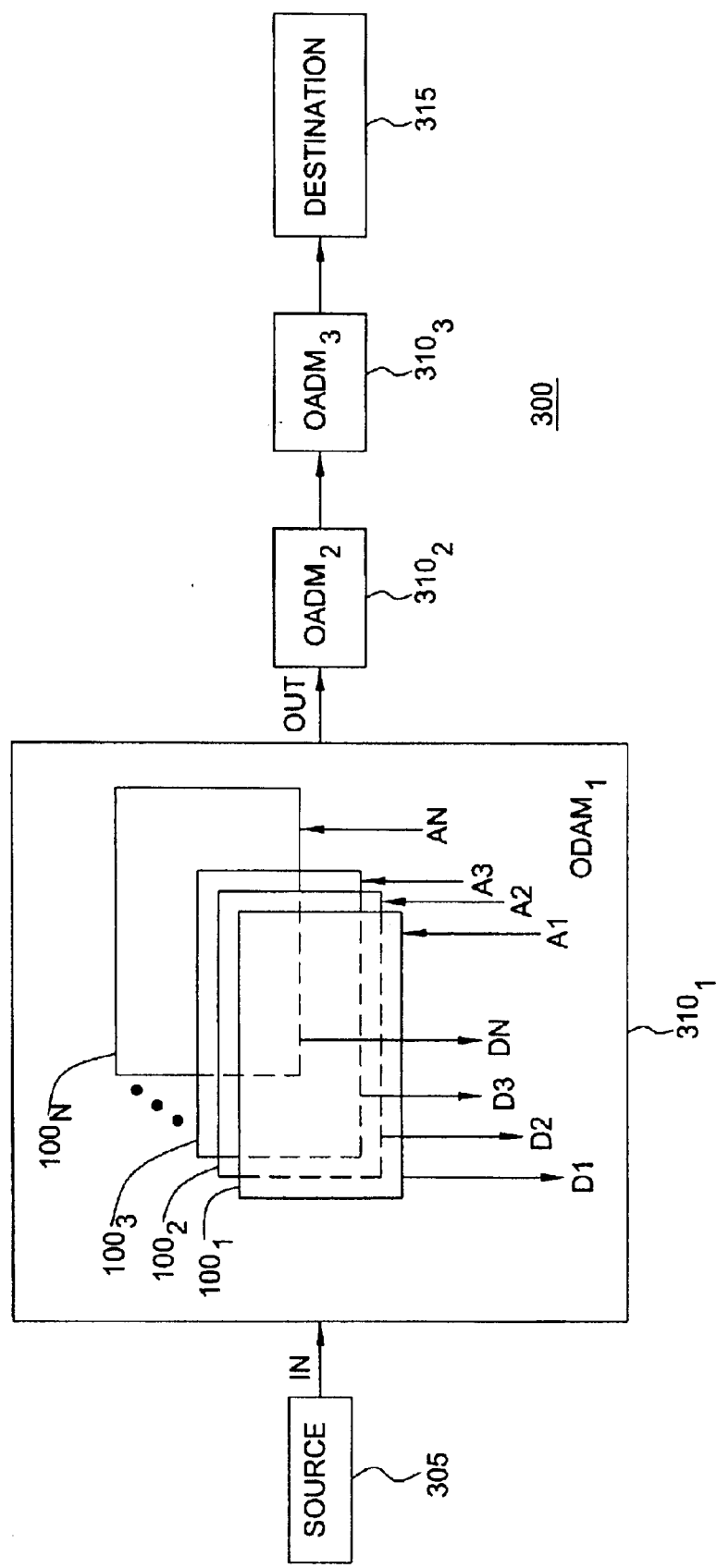
FIG. 3 depicts a high level block diagram of a system according to an embodiment of the present invention.

FIG. 3 depicts a high level block diagram of a system according to an embodiment of the present invention. Specifically, the system 300 of FIG. 3 comprises an optical communications system including an optical source 305, a plurality (illustratively three) of optical add/drop multiplexers $310_1$, $310_2$, $310_3$ and a destination 315. While not shown, normally a reverse path is also provided to form thereby a bi-directional optical communications path.

The first OADM $310_1$ is constructed using a plurality of group processors formed according to the teachings discussed above with respect to FIG. 1. Specifically, each of a plurality of wavelength group processors $100_1$, $100_2$ and so on up to $100_N$ (collectively group processors 100) operates on respective (and/or overlapping) groups of wavelength channels within a wavelength division multiplex (WDM) signal IN. For example, if each of the group processors 100 operates on eight respective optical channels, eight group processors 100 are utilized to provide full add/drop capability within the context of a 64 channel WDM signal. More or fewer group processors 100 may be used depending upon the number of channels. Moreover, where some portion of the optical channels within the WDM system are always express with respect to the particular OADM 310, fewer group processors may be used (i.e., the number of group processors 100 used may be scaled up or down depending upon the particular application). The source 305 and destination 315 elements may comprise any conventional optical network initiation and termination points. It is noted that the group processors 100 may be arranged in a serial manner, parallel manner or combination of series and parallel manner with respect to the input signal IN and output signal OUT.

Thus, an optical add/drop multiplexer (OADM) may be realized using a plurality of group processors, where each group processor is formed substantially in accordance with the apparatus of FIG. 1. Specifically, each group processor us used to process a respective group of optical channels within the WDM signal. It is noted that the optical channels forming each group may be exclusive to that group or may be mapped to multiple groups. Moreover, it is noted that the band pass filters (110, 180) for the group processors 100 operate to extract/insert multiple channel groups from/to the WDM signal. Finally, it is noted that one or a plurality of such OADMs 310 may be used within an optical communications system 300.

Although various embodiments that incorporate the teachings of the present invention have been shown and described in detail herein, those skilled in the art can readily devise many other varied embodiments that still incorporate these teachings.

What is claimed is:

1. Apparatus, comprising:
   a first dispersion compensator, for imparting a first dispersion compensation to a group of optical channels from a wavelength division multiplexed (WDM) signal to produce a corresponding group of first dispersion compensated optical channels;
   an optical multiplexer, for multiplexing at least one of said group of first dispersion compensated optical channels with any additional optical channels to produce an output group of optical channels; and
   a second dispersion compensator, for imparting a second dispersion compensation to the output group of optical channels to produce a corresponding group of second dispersion compensated optical channels;
   said second dispersion compensation is selected to be an appropriate dispersion compensation for added optical channels; and
   said first dispersion compensation is selected to substantially cancel the effects of said second dispersion compensation imparted to said at least one of said group of first dispersion compensated optical channels provided to said multiplexer.

2. The apparatus of claim 1, further comprising:
   a first bandpass filter, for extracting said group of optical channels from said wavelength division multiplexed (WDM) signal.

3. The apparatus of claim 2, further comprising:
   a second bandpass filter, for inserting said group of second dispersion compensated optical channels into said WDM signal.

4. The apparatus of claim 1, wherein said second dispersion compensation comprises a negative dispersion compensation and said first dispersion compensation comprises a positive dispersion compensation.

5. The apparatus of claim 4, wherein said second dispersion compensation comprises approximately −300 picoseconds per nanometer.

6. The apparatus of claim 1, wherein:
   said apparatus is used to implement each of a plurality of group processors within an optical add drop multiplexer (OADM), each of said group processors responsive to a respective subset of optical channels within said WDM signal.

7. The apparatus of claim 1, wherein:
   each of a plurality of said OADMs are used within an optical communications system.

8. A method, comprising:
   imparting a first dispersion compensation to a group of optical channels from a wavelength division multiplexed (WDM) signal to produce a corresponding group of first dispersion compensated optical channels;
   multiplexing at least one of said group of first dispersion compensated optical channels with any additional optical channels to produce an output group of optical channels; and
   imparting a second dispersion compensation to the output group of optical channels to produce a corresponding group of second dispersion compensated optical channels; wherein
   said second dispersion compensation is selected to be an appropriate dispersion compensation for added optical channels; and
   said first dispersion compensation is selected to substantially cancel the effects of said second dispersion compensation imparted to said at least one of said group of first dispersion compensated optical channels provided to said multiplexer.

9. The method of claim 8, further comprising:
   extracting said group of optical channels from said wavelength division multiplexed (WDM) signal.

10. The method of claim 9, further comprising:
    inserting said group of second dispersion compensated optical channels into said WDM signal.

11. The method of claim 8, wherein:

said second dispersion compensation $D_2$ comprises a negative 10 dispersion compensation and said first dispersion compensation $D_1$ comprises a positive dispersion compensation.

12. The method of claim 11, wherein said second dispersion compensation comprises approximately −300 picoseconds per nanometer.

13. An optical add/drop multiplexer (OADM), comprising:

a plurality of wavelength channel group processors, each of said wavelength channel group processors operative to selectively provide at least one of optical channel drop, pass through and add functions for those optical channels within a respective group of optical channels, each of said wavelength channel group processors comprising:

a first dispersion compensator, for imparting a first dispersion compensation to a respective group of optical channels from a wavelength division multiplexed (WDM) signal to produce a corresponding group of first dispersion compensated optical channels;

an optical multiplexer, for multiplexing at least one of said group of first dispersion compensated optical channels with any additional optical channels to produce an output group of optical channels; and a second dispersion compensator, for imparting a second dispersion compensation to the output group of optical channels to produce a corresponding group of second dispersion compensated optical channels;

said second dispersion compensation is selected to be an appropriate dispersion compensation for added optical channels; and said first dispersion compensation is selected to substantially cancel the effects of said second dispersion compensation imparted to said at least one of said group of first dispersion compensated optical channels provided to said multiplexer.

14. The OADM of claim 13, wherein each of said wavelength channel group processors further comprises:

a first bandpass filter, for extracting said group of optical channels from said wavelength division multiplexed (WDM) signal.

15. The OADM of claim 14, wherein each of said wavelength channel group processors further comprises:

a second bandpass filter, for inserting said group of second dispersion compensated optical channels into said WDM signal.

16. The OADM of claim 13, wherein:

said second dispersion compensation comprises a negative dispersion compensation and said first dispersion compensation comprises a positive dispersion compensation.

17. The OADM of claim 13, wherein:

said wavelength channel group processors are coupled together in at least one of a series and parallel manner.

18. The OADM of claim 13, wherein said second dispersion compensation comprises approximately −300 picoseconds.per nanometer.

* * * * *